United States Patent

[11] 3,624,299

[72] Inventor Reuven Meidan
Stony Brook, N.Y.
[21] Appl. No. 876,393
[22] Filed Nov. 13, 1969
[45] Patented Nov. 30, 1971
[73] Assignee Applied Digital Data Systems, Inc.

[54] APPARATUS AND METHOD
9 Claims, 4 Drawing Figs.

[52] U.S. Cl. .......... 179/1 C, 328/165
[51] Int. Cl. .......... H04m 11/06
[50] Field of Search .......... 179/1 C, 2 C, 2.7 D, 15.55 TC, 15 AV; 325/46, 123, 124; 328/165

[56] References Cited
UNITED STATES PATENTS 3,535,456 10/1970 Wilson .......... 179/2
2,795,650 6/1957 Levine .......... 179/15

*Primary Examiner*—Kathleen H. Claffy
*Assistant Examiner*—Horst F. Brauner
*Attorneys*—Morton, Bernard, Brown, Roberts & Sutherland, John W. Behringer, Martin T. Brown, W. Brown Morton, Jr., Eugene L. Bernard, James N. Presser, John T. Roberts and Malcolm L. Sutherland

ABSTRACT: A method of and an apparatus for cancelling second harmonics in electrical signals resulting from nonlinear devices within electrical networks. The signal applied to the network includes not only the fundamental frequency of interest, but also a component at a frequency equal to the third harmonic of that fundamental frequency. If a nonlinear device is included in the network, energy at new frequencies is generated including components at the frequency of the second harmonic of the fundamental frequency of interest. These second harmonic components are adjusted to cancel each other so that the output has no component at that second harmonic frequency. This cancellation is usable in a broad range of applications including, for example, acoustic couplers utilized in data transmission over telephone networks in which the telephone microphone is nonlinear, causing second harmonics of the transmitted signal which if uncancelled would interfere with received signals during full-duplex operation.

INVENTOR
REUVEN MEIDAN

BY McLean, Morton & Boustead
ATTORNEYS

APPARATUS AND METHOD

The present invention pertains to cancellation of second harmonic signals in electrical apparatus. More particularly, the present invention pertains to an apparatus for and a method of cancelling second harmonic signals induced in alternating current circuitry by nonlinear devices.

Numerous electrical and electromechanical apparatus include nonlinear devices which cause the presence of harmonics of the fundamental signal frequency found in the apparatus. Many electrical components, have in practice nonlinear characteristics, and, therefore, cause harmonics of the fundamental signal frequency to be present in the output. By way of example, electro acoustic apparatus such as a carbon microphone often are nonlinear in their response to acoustic signals. In many applications, the resulting harmonics are not particularly a problem, since the apparatus either is not frequency dependent or can be designed to be responsive only to the fundamental frequency. In other applications, the third and higher harmonics are not a problem, because they are of a frequency so high that they do not affect operation of the equipment, or are out of the band of operation, but the second harmonic is a problem source since it is of a frequency within a range to which the apparatus responds.

By way of example, in the time-sharing of data processing equipment, data is applied to the processing equipment from a remote input terminal through an electro acoustic coupler and a commercial telephone line. In one widely used system of this type, data to be applied to the processing equipment is transmitted over a commercial telephone line at frequencies of 1,070 and 1,270 hertz; and data from the processing equipment is transmitted over the same telephone line at 2,025 and 2,225 hertz. The data transmission circuit, however, includes a "side tone" path which returns to the telephone earphone the output of the telephone microphone. The majority of microphones utilized in telephone handsets have a nonlinear response to the acoustic signals applied to them. Consequently, the microphone output includes not only the fundamental transmission frequency of, for example, 1,070 and 1,270 hertz, but also harmonics of this frequency. When operating in the full-duplex mode, the apparatus sends and receives signals simultaneously. As a consequence, on the receiving end, i.e. at the telephone earphone, desired signals are present at the 2,025 and 2,225 hertz frequency received over the telephone network from the data processing equipment, and undesired interference is present at the 2,140 and 2,540 hertz frequencies of the second harmonics of the transmitted signals. In addition, the higher harmonics of the transmitted signals are also applied to the telephone earphone, but since the data system receiving equipment needs only be responsive to signals in the 2,025 and 2,225 hertz range, these higher harmonics can be filtered out. The second harmonics however, cannot be filtered out because such filtering would also remove the desired signals. Thus, these second harmonics present a problem, particularly since the received signal is weak due to line attenuation.

It has been proposed that the second harmonic of the fundamental applied frequency be generated and applied with an inverted phase to the telephone microphone to cancel the second harmonic. It is desired however, that the acoustic coupler be suited for use with any telephone handset. The use of the inverted second harmonic frequency to cancel second harmonics caused by nonlinear telephone microphones is not amenable to this desired broad use, however, since the generation of second harmonics varies from one telephone microphone to the other, and some might not generate second harmonics which require cancellation at all. Use of this approach in a system having a linear telephone microphone would result in the generated second harmonic frequency signal itself being a noise source.

The present invention is a method of and an apparatus for cancelling second harmonics resulting from nonlinear devices in electrical circuitry. In accordance with the present invention the signal applied to the circuitry includes both the fundamental frequency of interest and the third harmonic frequency of that fundamental frequency. If a nonlinear device is included in the circuitry, new frequencies are generated. These new frequencies include components at the frequency of the second harmonic of the fundamental frequency of interest which components can be adjusted to cancel each other. As a consequence, the microphone output signal has no component at the frequency of the second harmonic of the fundamental frequency of interest. Since this cancellation results from passage of the signal including the fundamental frequency of interest and a frequency equal to the third harmonic of the fundamental frequency through a nonlinear device, operation in accordance with the present invention provides satisfactory performance independent of the degree of the nonlinearity of the device. Thus, for example, an acoustic coupler incorporating the present invention not only can be used with telephones having microphones exhibiting nonlinear properties, but also can be used with telephones having linear microphones.

These and other aspects and advantages of the present invention are more apparent in the following detailed description and claims, particularly when read in conjunction with the accompanying drawing. In the drawing:

Figure 1:
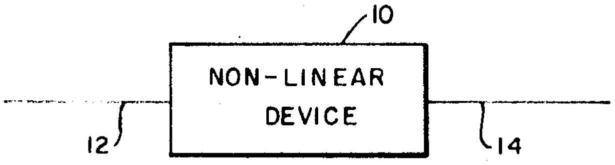
FIG. 1 is a block diagram of a generalized theoretical application of the present invention.

FIG. 1 depicts the generalized theoretical situation in which a nonlinear device 10 receives an input $x$ on line 12 and provides an output $y$ on line 14. Whereas in a linear device $y=ax$, with nonlinear device 10, the output can be approximated by $y=ax+bx^2+cx^3$. If the applied signal $x$ is given by $x=k_1 \sin(wt+\Phi_1)$ (1)

then the output signal $y$ is given by $y=ak_1 \sin(wt+\Phi_1)+bk_1^2 \sin^2(wt+\Phi_1)+ck_1^3 \sin^3(wt+\Phi_1)$ (2)

Since $\sin^2 A=\frac{1}{2}(1-\cos 2A)$, there is a second harmonic component in this output signal having a value $$A=\frac{-bk_1^2}{2}\cos(2\,wt.+\phi_1)$$

This is the second harmonic term which is to be eliminated. To do this a third harmonic signal is added to the input so that $x=k_1 \sin(wt+\Phi_1)+k_2 \sin(3wt+\Phi_2)$ (3)

As a result of this, the output $y$ on line 14 is given by $$y=a[k_1 \sin(\text{wt.}+\phi_1)+k_2 \sin(3\text{ wt.}+\phi_2)]+b[k_1 \sin(\text{wt.}+\phi_1)+k_2 \sin(3\text{ wt.}+\phi_2)]^2+\ldots$$

Since the third order terms do not contribute second harmonic components, they can be ignored. The second order term $b[k_1 \sin(wt+\Phi_1)+k_2 \sin(3wt+\Phi_2)]^2$ can be expanded to $b[k_1^2 \sin^2(wt+\Phi_1)+2k_1k_2 \sin(wt+\Phi_1)\sin(3wt+\Phi_2)+Q]$, *where* $Q$ does not contribute to the second harmonic. Since $\sin A \sin B = \frac{1}{2}[\cos(A-B)-\text{Cos}(A+B)]$, the second harmonic components of interest are $$P=\frac{-bk_1^2}{2}\cos(2\text{ wt.}+\phi_1)bk_1k_2\cos(2\text{ wt.}+\phi_2)$$

Thus, to cancel the second harmonic energy in the output $y$, it is necessary that $$\frac{bk_1^2}{2}\cos(2\text{ wt.}+\phi_1)=bk_1k_2\cos(2\text{ wt.}+\phi_2)$$

For this to be true, it is required that $\Phi_2=\Phi_1$ and $k_2=(k_1)/2$. If the equations are normalized so that $k_1=1$, then $k_2=\frac{1}{2}$. It should be noted that the nonlinearity of the device $b$ is not present in cancellation equation.

FIG. 1 depicts the theoretical case in which we have direct access to the input $x$ of the nonfrequency dependent nonlinear device 10. In practice, however, it may happen that we have to consider a more general frequency dependent nonlinear device.

Figure 2:
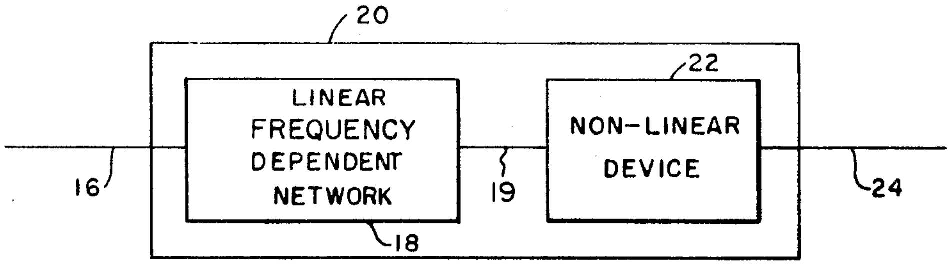
FIG. 2 is a block diagram of a generalized practical application of the present invention.

FIG. 2 depicts the mathematical model of the generalized practical case. Input line 16 applies the input signal $x$ to a linear frequency dependent network 18 within transfer device 20. Network 18 is described by a complex transfer function $A(w)\ Exp\ [i\Phi(w)]$. This means that if $X(w)$ is the fourier transform of input $x$, then $Z(w)$, the fourier transform of the signal in line 19, which is the output $z$ of network 18, is equal to $Z(w)=X(w)A(w)e^{i\phi(w)}$. The signal $z$ is now applied to the nonlinear device 22 within transfer device 20. The characteristics of device 22 are the same as that of device 10 in FIG. 1, which was described earlier as the generalized theoretical model. Let the input $x$ to the device 20 consist of first and third harmonics, namely $x=k_1 \sin (wt+\Phi_1)+k_2 \sin (3wt+\Phi_2)$. Then at the output $z$ of the linear device 18 we will have $z+A(w)k_1 \sin [wt+\Phi_1+\Phi(w)]+A(3w)k_2 \sin [wt+\Phi_2+\Phi(3w)]$. This signal $z$ is now fed into the input of the nonlinear device 22. In order to cancel the second harmonic term in the output $y$ in line 24 we apply the cancellation condition to line 19, which is the input $z$ to the nonlinear device 22. Namely, $A(3w)k_2=\frac{1}{2}A(w)k_1$ and $\Phi_1+\Phi(w)=\Phi_2+\Phi(3w)$. From this we get the amplitude and phase of the third harmonic to be added to the signal at the input 16 to the transfer device 20. Namely, $$k_2=\frac{1}{2}\frac{A\ (w)}{A(3w)}\ k_1 \text{ and } \phi_2=\phi_1+\phi(w)-\phi(3w).$$

This utilization of an input signal with a component at a frequency equal to the third harmonic of the fundamental frequency of interest to cause cancellation of induced second harmonics of that fundamental frequency is applicable with any nonlinear device. By way of example, second harmonics in the output of the microphone of a telephone can be cancelled by this technique.

In many data-processing systems, numerous remote input/output terminals are permitted access to centrally located data processing equipment on a shared-time basis. Frequently these remote terminals are coupled to the processing equipment over commercial telephone lines. The input/output device is connected to an electroacoustic transducer, commonly referred to as an acoustic coupler, which converts electrical signals from the input device to acoustic signals that are picked up by the telephone microphone and converted to electrical signals that are transmitted over the commercial telephone network to the data-processing equipment. Simultaneously, the data-processing equipment sends electrical output signals over that same telephone network to the telephone speaker which converts them to acoustic signals that are picked up by the acoustic coupler and converted to electrical signals which are applied to the input/output device. In such systems presently in commercial use, the acoustic coupler applies signals of 1,070 hertz and 1,270 hertz to the telephone microphone to be transmitted to the data-processing equipment, and the processing equipment applies signals of 2,025 and 2,225 hertz to the telephone speaker for application to the acoustic coupler. These frequencies permit simultaneous transmission to and from the data-processing equipment in a full-duplex mode. The telephone microphone is nonlinear, however, and so harmonics of the 1,070 and 1,270 hertz transmitted frequencies are present in the microphone output. This output travels over the telephone "side-tone" paths to the telephone speaker where it combines with the received signals from the data-processing equipment. The 2,140 and 2,540 hertz second harmonics of the transmitted frequency interfere with the 2,025 and 2,225 hertz received frequencies.

In accordance with the present invention, inclusion in the output signal from the acoustic coupler of a component with a frequency equal to the third harmonic of the fundamental frequency of interest permits cancellation of these second harmonics.

Figure 3:
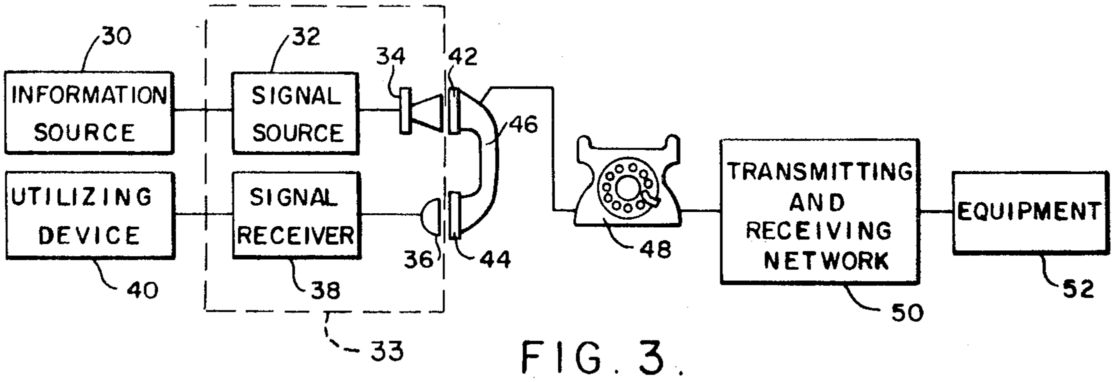
FIG. 3 is a block diagram of an acoustically coupled data transmission system incorporating the present invention.

As depicted in FIG. 3, information source 30 is connected to signal source 32 of an acoustic coupler 33. Information source 30 provides digital signals to signal source 32. Signal source 32 in turn provides an alternating signal the frequency of which is dependent upon the digital signal applied from information source 30. Thus, for example, if the digital signal from information source 30 is a binary zero or a space, then signal source 32 might provide a 1,070 hertz signal. If the digital signal from information source 30 is binary one or a mark, then signal source 32 might provide a 1,270 hertz signal. The output of signal source 32 is applied to loudspeaker 34 of the acoustic coupler. Microphone 36 of the acoustic coupler has its output connected to signal receiver 38 which in turn has its output connected to utilizing device 40. In commonly utilized data transmission networks, received signals of 2,025 hertz represent a binary zero or a space, while a received signal of 2,225 hertz represents a binary one or a mark. Signal receiver 38 decodes these received 2,025 and 2,225 hertz signals to digital signals which are applied to utilizing device 40. Utilizing device 40 can be a piece of data-processing equipment or an output device such as a typewriter.

Loudspeaker 34 and microphone 36 of the acoustic coupler 33 are adjacent to microphone 42 and earphone 44 respectively of handset 46 from telephone 48. Conveniently, the acoustic coupler can have loudspeaker 34 and microphone 36 mounted in a manner which provides a cradle to hold handset 46 with microphone 42 and earphone 44 in the desired positions. Telephone 48 is a conventional commercial telephone forming a part of a commercial telephone system. Telephone 48 is connected to switching equipment and other circuitry within transmitting and receiving network 50 which is generally remotely located within a telephone local office.

When it is desired to utilize the acoustic coupler, telephone 48 is dialed to "call" the automatic data-processing equipment. In response to the dialing pulses, transmitting and receiving network 50 connects telephone 48 to equipment 52 which can be centrally located automatic processing equipment. Upon receipt at telephone 48 of a signal indicating that equipment 52 is ready to receive signals from information source 30 and to transmit signals to utilizing device 40, handset 46 is placed on the acoustic coupler with telephone microphone 42 and telephone earphone 44 adjacent loudspeaker 34 and microphone 36 respectively. Digital signals from information source 30 are then converted by signal source 32 to signals such as 1,070 and 1,270 hertz signals. These are applied to loudspeaker 34 which converts them to acoustic signals that are picked up by microphone 42. Within handset 46 these signals are again converted to electrical signals of 1,070 and 1,270 hertz for transmission through network 50 to equipment 52. The nonlinear properties of microphone 42 cause harmonics of the applied frequencies also to be present in the electrical signal output from the telephone microphone. The "side-tone" path within the telephone equipment results in the output of microphone 42 being applied to speaker 44. When the apparatus is operated in the full-duplex mode, signals are simultaneously transmitted from information source 30 via telephone 48 at 1,070 and 1,270 hertz and received by utilizing device 40 via telephone 48 at 2,025 and 2,225 hertz. The second harmonics of the transmitted signals are at a frequency of 2,140 and 2,540 hertz. These second harmonics, which fall in the range of approximately 2,100 to 2,600 hertz frequency fall within the received signal frequency range. Accordingly, this second harmonic is a source of noise in the received signal, and has resulted in it being necessary that equipment 52 be located relatively close to telephone 48 so that the signals received by telephone 48 from equipment 52 are of sufficient strength to be distinguished from the second harmonic in the output of telephone microphone 42. These received electrical signals are converted to acoustic signals by earphone 44 and are picked up by microphone 36 with converts them to electrical signals for application to signal receiver 38 which in turn converts them to digital pulses for application to utilizing device 40.

Figure 4:
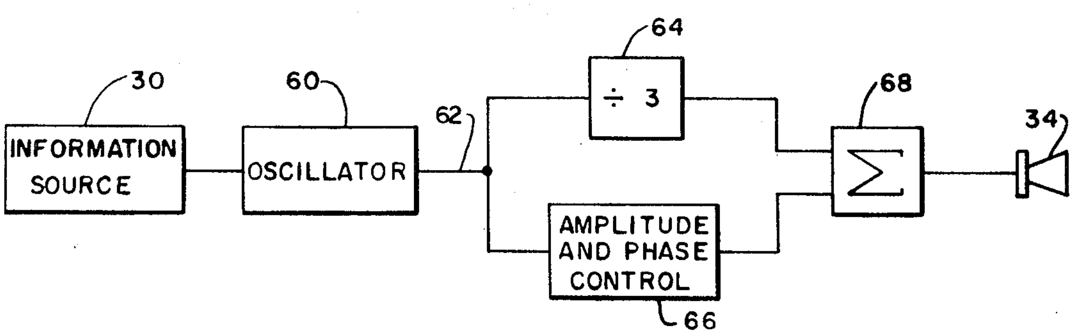
FIG. 4 is a block diagram of a signal source suitable for use in the acoustic coupler of FIG. 3.

To cancel these induced second harmonic signals, signal source 32 applies to loudspeaker 34 not only the desired signal fundamental frequency, for example, 1,070 and 1,270 hertz, but also the third harmonics of these frequencies. Thus, as depicted, in FIG. 4, information source 30 is connected to oscillator 60 which generates the required frequency. For example, when information source 30 applies a binary zero or a space to oscillator 60, the oscillator provides an output on line 62 of 3,210 hertz. When information source 30 applies a binary one or a mark to oscillator 60, the oscillator provides an output on line 62 of 3,810 hertz. Line 62 applies the output of oscillator 60 to frequency dividing circuit 64 which divides the frequency by three. Thus the output of frequency-dividing circuit 64 is the desired 1,070 and 1,270 hertz fundamental frequency signals representing the digital signals originated by information source 30. Line 62 also applies the output of oscillator 60 to amplitude and phase control circuit 66. The output of frequency dividing circuit 66 is thus the signal $k_1 \sin(wt+\Phi_1)$, while the output of amplitude and phase control circuit 66 is the signal $k_2 \sin(3wt+\Phi_2)$.

These two signals are summed within summing network 68 and applied to loudspeaker 34 as signals in the form of equation 3 above. Loudspeaker 34 converts this electrical signal to an acoustic signal that is detected by microphone 42 of telephone 48. If microphone 42 in nonlinear, second harmonics are present in its output which is therefor of the form of equation (4) above. Amplitude and phase control circuit 66 is adjusted to cause the values of $k_2$ and $\Phi_2$ to be such that the second harmonics within the output of telephone microphone 42 cancel each other. If microphone 42 is linear, then no second harmonic results. Since the third harmonic signal, $k_2 \sin(3wt+\Phi_2)$ is outside the frequency range of concern, it causes no problem in the operation of the apparatus. Thus, an acoustic coupler utilizing this third harmonic of the fundamental frequency of interest is useable with both linear and nonlinear telephone microphones.

The present invention has been described generally and has been considered with reference to a specific example. Numerous other specific applications of this general technique for cancelling second harmonics could also be found which are within the scope of the invention.

What is claimed is:

1. A method of cancelling the second harmonic component of a fundamental frequency signal resulting from application of the fundamental frequency signal to a nonlinear device comprising adding to the fundamental frequency signal prior to application to the nonlinear device a component having a frequency equal to the third harmonic of the fundamental frequency signal and adjusting the magnitude and phase of the added component to substantially eliminate the second harmonic component.

2. A method as claimed in claim 1 in which the added component magnitude is adjusted to a value substantially one-half the magnitude of the fundamental frequency signal prior to application to the nonlinear device.

3. A method as claimed in claim 2 in which the added component phase is adjusted to bring the added component substantially into phase with the fundamental frequency signal.

4. A method of obtaining in response to an input fundamental frequency signal applied to a nonlinear circuit device an output signal including a component at the frequency of the input fundamental frequency signal and lacking components at the frequency of the second harmonic of the input fundamental frequency signal, said method comprising applying to the nonlinear circuit device a composite input signal including a first portion consisting of the input fundamental frequency signal and including a second portion consisting of a signal at a frequency equal to the third harmonic of the input fundamental frequency signal, and adjusting the magnitude and phase of the second portion to substantially eliminate from the output signal components at the frequency of the second harmonic of the fundamental frequency signal.

5. A method as claimed in claim 4 in which the composite input signal is generated by generating a first signal at a frequency equal to the third harmonic of the fundamental frequency signal, applying the first signal to a frequency divider to generate the first portion, applying the first signal to a magnitude and phase controller to generate the second portion, and summing the first portion and the second portion.

6. Apparatus for cancelling the second harmonic component of a fundamental frequency signal resulting from application of the fundamental frequency signal to a nonlinear device comprising a first signal source for providing a fundamental frequency signal; a second signal source for providing a second signal with a frequency equal to the third harmonic of the fundamental frequency signal, the second signal source including means for adjusting the magnitude and phase of the second signal; relative to the first means for summing the fundamental frequency signal and the second signal; and means for applying the summed fundamental frequency signal and second signal to a nonlinear device.

7. Apparatus as claimed in claim 6:

a. further comprising an oscillator for providing an oscillator signal at a frequency equal to the third harmonic of the fundamental frequency signal; and
b. in which the first signal source comprises a frequency divider connected to the oscillator for generating the fundamental frequency signal and the second signal source comprises an amplitude and phase controller connected to the oscillator for generating the second signal.

8. An electroacoustic coupler comprising:

an oscillator adapted for connection to a source of digital signals, said oscillator providing in response to a digital signal of a first type a first oscillator output of a first frequency, said oscillator providing in response to a digital signal of a second type a second oscillator output of a second frequency;
a frequency divider connected to the oscillator for dividing the frequency of signals applied thereto by three to provide a first fundamental frequency signal in response to the first oscillator output and a second fundamental frequency signal in response to the second oscillator output;
amplitude and phase control means connected to the oscillator for providing an amplitude-and-phase controlled signal;
summing means connected to the frequency divider and to the amplitude-and-phase control means, for providing the combined output from the frequency divider and the amplitude-and-phase control means;
a loudspeaker connected to the summing means for providing acoustic signals in response to the combined output from the summing means;
a microphone for providing electrical signals in response to acoustic signals applied thereto; and
signal receiver means connected to said microphone and adapted for connection to digital-signal-utilizing device for providing digital signals in response to electrical signals from the microphone.

9. In an electroacoustic coupler including means for providing a first fundamental frequency signal in response to a first digital signal of a first type and a second fundamental frequency signal in response to a digital signal of a second type, the improvement comprising means for providing with the first fundamental frequency signal a first component having a frequency equal to the third harmonic of the first fundamental frequency signal and with the second fundamental frequency signal a second component having a frequency equal to the third harmonic of the second fundamental frequency signal.

* * * * *